Feb. 17, 1942.  A. R. BLACK ET AL  2,273,344
APPARATUS FOR AGRICULTURAL SPRAYING
Filed May 22, 1939  2 Sheets-Sheet 1
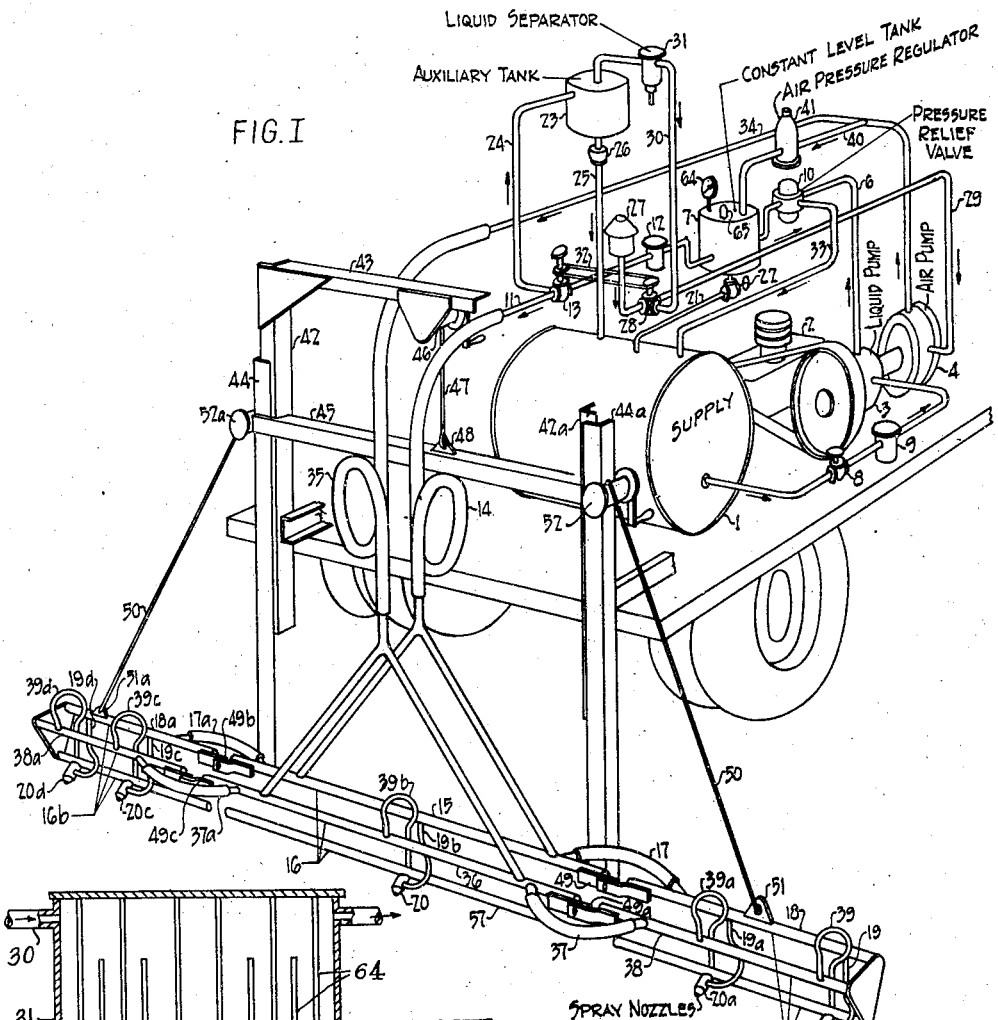
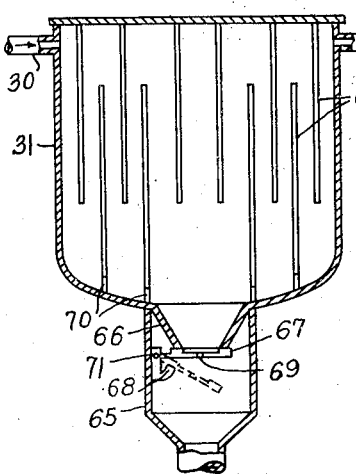
Inventors: Everett Burr Glendenning
Alexander Robson Black
By their Attorney:

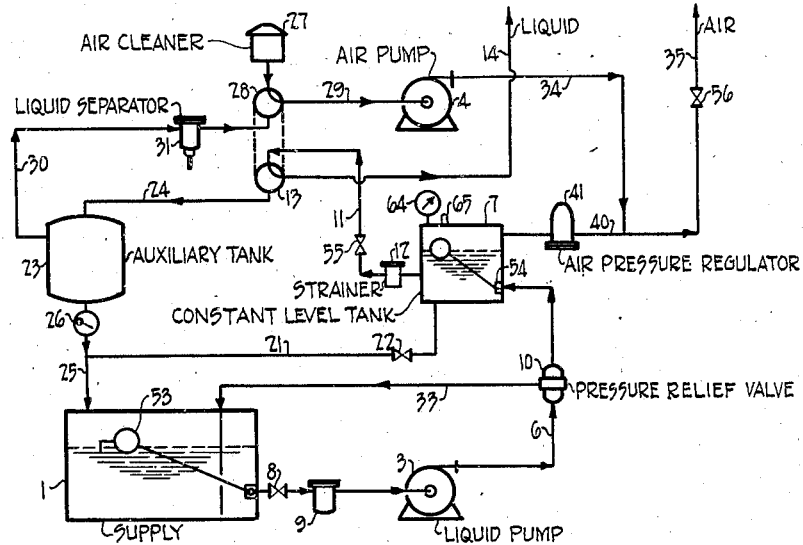
FIG. II
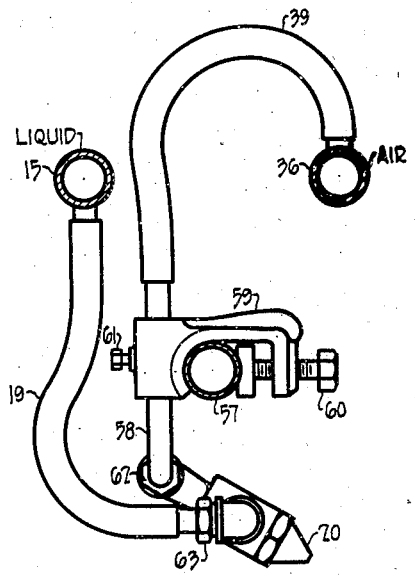
FIG. III
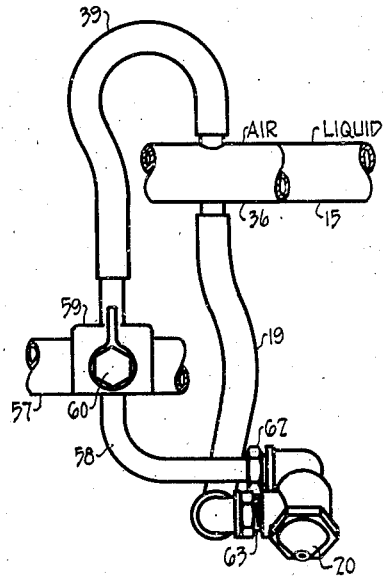
FIG. IV
Inventors: Everett Burr Glendenning
Alexander Robson Black
By their Attorney:

Patented Feb. 17, 1942

2,273,344

UNITED STATES PATENT OFFICE 2,273,344

APPARATUS FOR AGRICULTURAL SPRAYING

Alexander Robson Black, Norwood, and Everett Burr Glendenning, Cranford, N. J., assignors to Shell Development Company, San Francisco, Calif., a corporation of Delaware Application May 22, 1939, Serial No. 275,052

2 Claims. (Cl. 299—40)

The present invention relates generally to means for applying liquid insecticidal or fungicidal preparations to plants, trees, vegetation and the like.

More particularly, the invention relates to portable power driven apparatus adapted to apply effective amounts of either of said materials simultaneously to a plurality of plants or trees in a tract or area.

It is an object of the invention to provide equipment for applying adequate amounts of pest or fungus destructive materials to pest infected or diseased growth in a minimum of time, with a minimum of labor, without waste of materials and without injury to the growth.

Another object of the invention is to provide apparatus of the aforementioned character which is simple to operate and control, and which can be economically employed.

Satisfactory equipment for use in treating large areas of plant growth must be capable of thoroughly spraying such areas with a minimum of time expended, must be simple to operate and sufficiently flexible to accommodate variations of terrain, such as hillsides or uneven ground, and susceptible to further adjustment for vegetation of varying heights. It should further be capable of distributing various amounts of spray material per unit of area of crop to be treated, depending upon the condition and type of vegetation and the particular spray being applied. For example, a particular crop may require treatment with three gallons of a certain insecticide per acre and another dissimilar growth, requiring another type or grade of insecticide, may require ten or more gallons of treating material per acre. The apparatus used for such applications should, therefore, be capable of simple and rapid adjustment to compensate for such variable demands as may be placed upon it.

The present apparatus falls in the class of force-type sprayers, i. e. the spray material is forced under pressure through atomizing means. The unit is self-contained and portable and may be carried on a truck, tractor, trailer, semi-trailer, skids, etc. Basically, the unit comprises an oil pump, an air pump, a supply tank and means for directing the spray material from the supply tank to an adjustable boom containing a plurality of atomizing nozzles.

Referring to the drawings which illustrate by way of example a particular form of the invention:

Figure I is a perspective view of the complete spraying unit.

Figure II is a schematic drawing showing the piping arrangement of the spraying unit.

Figure III is a side elevation of the atomizing nozzle mounting.

Figure IV is a front elevation of the atomizing nozzle mounting.

Figure V is a sectional elevation of one type of oil separator which may be embodied in the spraying unit.

In Figure I, a supply tank 1, driving motor 2, liquid pump 3 and air pump 4 are mounted on a motor truck bed 5 only part of which is shown. A liquid line 6 connects the supply tank 1 with a constant level chamber 7, passing through valve 8, cleaner 9, liquid pump 3 and a pressure relief valve 10. The constant level chamber 7 is provided with an air pressure gauge 64 and bleeder orifice 65. A liquid line 33, also leads from pressure relief valve 10 to supply tank 1. A liquid line 11 leads from the bottom of the constant level chamber 7 through a filter 12, a three-way valve 13, a flexible hose line 14 into the liquid line 15 of the center section 16 of the distributing boom. Flexible hoses 17 and 17a lead from the center section 16 of the distributing boom to the liquid lines 18 and 18a of the side arms 16a and 16b. Flexible hoses 19, 19a, 19b, 19c, 19d lead from the liquid line of the distributing boom to the atomizing nozzles 20, 20a, 20b, 20c, 20d. A liquid line 21 may, if desired, be incorporated returning from the constant level chamber 7 through valve 22 to the supply tank 1.

An auxiliary tank 23 is provided with a liquid line 24 leading from three-way valve 13. Another liquid line 25 leads from the auxiliary tank 23 through check valve 26 and returns to supply tank 1.

The intake side of the air pump 4 is connected to air-cleaner 27 and three-way valve 28 by line 29. Another air line 30 leads from three-way valve 28 through liquid separator 31 and is connected to the top of auxiliary tank 23. The two three-way valves 13 and 28 are connected by chain 32 or other common control means so that they may be operated simultaneously.

Air under pressure from the discharge side of the air pump 4 passes through line 34 to flexible hose 35, to the distributing boom air line 36 and hence through flexible hose 37 and 37a to the distributing boom side arm air lines 38 and 38a. From 36, 38 and 38a air is led to atomizing nozzles 20, 20a, 20b, 20c, 20d through flexible hoses 39, 39a, 39b, 39c, 39d. An air line 40 leads from air line 34 through an air pressure regulator 41 to the top of constant level chamber 7.

The supporting members 42, 42a and 43 for the distributing boom are rigidly and securely mounted on the truck bed 5. Members 44 and 44a are slidably mounted on members 42 and 42a and are connected by cross-member 45. A hand operated winch 46 is mounted on 43 and a flexible steel cable 47 wound on the winch 46 is attached at one end to cross-member 45 at 48.

The distributing boom side-arms 16a and 16b are pivotably attached at 49, 49a, 49b and 49c to the center section 16 of the boom. Flexible cables 50, attached at 51 and 51a to the side arms 16a and 16b, lead to hand operated winches 52 and 52a mounted on members 44 and 44a.

In Figure II, wherein like parts are given the same numerals as in Figure I, 3 is a liquid pump delivering spray material from a supply tank 1, preferably equipped with a floating suction 53 through valve 8, strainer 9 and pressure relief valve 10 by means of line 6 to a constant level chamber 7 and thence through strainer 12, valve 55, line 11, and three-way valve 13 to the liquid line 14 to the distributing boom.

An air pump 4 draws air in through air cleaner 27, three-way valve 28 and line 29 to the pump proper from where it is forced through line 35 and regulating valve 56 to the air line in the distributing boom. Air is also by-passed through air line 40 and air pressure regulator valve 41 to the top of the constant level chamber 7, which is provided with an air pressure gauge 64 and bleeder orifice 65; the constant level chamber is equipped with a float valve 54 which maintains a predetermined level of spray material in the chamber.

In liquid line 6 is provided a pressure-relief type regulating valve 10 which is set to maintain an oil pressure insufficient to open float-valve 54 connected to constant level chamber 4. The excess liquid pumped is returned through line 33 to the bottom of supply tank 1.

The three-way valve 13 is further connected to line 24 and an auxiliary tank 23, which is in turn connected by check-valve 26 and line 25 to supply tank 1. Three way valve 28 is also connected to auxiliary tank 23 by means of air line 30 which has attached thereto a self-draining oil separator 31.

Constant level chamber 7 may be further equipped with a circulation and by-pass line comprising valve 22 and line 21 which serves to conduct liquid from the bottom of constant level chamber 7 to line 25 and thence back to supply tank 1.

Figure III illustrates a side elevation of the atomizer nozzle mountings whereby various adjustments of the spraying angles may be made. The tubular member 57 of the distributing boom is provided with a clamping arrangement 59 which supports a tubular section 58 leading from flexible air hose 39 to atomizing nozzle 20. Clamp 59 is held in position on tubular member 57 by means of clamping screw 60. The tubular section 58 is held in position in clamp member 59 by means of set screw 61. A swing joint 62 serves to connect tubular member 58 to atomizer nozzle 20. The flexible liquid hose 19 is attached to the body of atomizing nozzle 20 at 63.

The swing joint 62 permits rotational adjustment in a vertical plane of nozzle 20. By loosening set screw 61, rotational adjustment in a horizontal plane will be permitted as will vertical adjustment of the nozzle and connections as a unit. By loosening clamp screw 60, further nozzle adjustment in a vertical plane may be secured.

The operation of the spraying machine is as follows:

The atomizing nozzles (as shown in Figures III and IV) are adjusted to the most advantageous position according to the vegetation to be sprayed. The distributing boom (as shown in Figure I) is then raised or lowered by means of winch 46 and cable 47 to the desired height and side arms 16a and 16b raised or lowered by means of winches 52 and 52a depending upon the terrain or type of crop being sprayed. When not in operation, these side arms will normally be maintained in a position perpendicular to the center section 16 of the boom to facilitate road travel and garaging. The distributing boom may be of such size, and has thereon as many nozzle units as desirable and practicable.

If desired to spray large trees a distributor boom of different design from that shown herein must be used as will be readily understood by those skilled in the art.

After the distributing boom and atomizing nozzles have been set in the desired positions, the air and liquid pumps are started, valves 55 and 22, (as shown in Figure II), being closed. In this way, spray material will be pumped from the supply tank 1 to the float-valve controlled constant level chamber 7.

Since, as previously stated, the pressure relief valve 10 is set at a pressure insufficient to open float valve 54, liquid will be pumped to chamber 7 until the desired liquid level has been reached and then by-passed through pressure relief valve 10 and line 33 to supply tank 1. This arrangement serves a double purpose, to maintain the desired liquid level in the constant level chamber without adjusting the pumping rate and to agitate the material in the supply tank by continuous recirculation. To provide further agitation when the tendency for various components of a spraying liquid to separate is particularly pronounced, a line 21 may be used to return liquid from the constant level chamber to the supply tank. By operation of valve 22, a portion of the spray liquid in the constant level chamber may be recirculated to the supply tank.

The air pressure regulating valve 41 is then adjusted until the desired pressure is present above the liquid in the constant level chamber. Valve 55 is then opened, three-way valve 13 having been previously turned to permit flow from the constant level chamber 7 through line 11 to the hose 14 and thus to the distributing boom. Three-way valve 13 is arranged to operate simultaneously with three-way valve 28, so that when valve 13 is turned, as described above, valve 28 will permit air to pass through air cleaner 27 and line 29 to the intake side of the air pump 4. The opening of valve 55 will then permit spray material to flow to the distributing boom for atomizing purposes.

The present invention also provides an arrangement for instantaneously shutting off temporarily the flow of spray material to the atomizing nozzles and at the same time preventing drippage from the nozzles. Referring again to Figure II, and assuming that the machine is in normal operation and the end of a crop row is reached, or for some other reason it is desired to shut off the atomized spray, the three-way valve 13 is turned to open a passage from the distributing boom through lines 11 and 24 to an auxiliary tank 23. Since three-way valve 13 is adapted to operate simultaneously with three-way valve 28, this last mentioned valve will simultaneously turn and permit passage of air from auxiliary tank 23 through lines 30 and 29 to the intake side of air pump 4, thus creating a partial vacuum in auxiliary tank 23.

As a result, the flow of liquid from the constant level chamber 7 to the distributing boom will be stopped and the liquid material remaining in the distributing boom and the lines leading thereto will be drawn into auxiliary tank 23 which has a capacity sufficient to hold the same. The check valve 26 will close line 25 as long as there is a reduced pressure in the auxiliary tank 23.

When the simultaneously operating three-way valves 13 and 28 are again turned to their normal operating position, the drain-hole of self-draining oil separator 31 will act as a release valve and admit atmospheric air to the auxiliary tank 23, whereupon check-valve 26 will open and permith the contents of the tank to drain through line 25 back to supply tank 1. A suitable type of oil separator 31 is shown in Figure V. The closed body member 31 is provided with a series of baffle plates 64 extending from the top and bottom of the chamber 31. Perforations, as at 70, are provided at the base of the upwardly extending baffle plates to permit entrapped oil to drain into the discharge outlet 66. A flap valve 67 seats against the opening of discharge outlet 66. A small perforation is provided in flap valve 67 at 69. A stop member 68 limits the maximum degree of opening of flap valve 67, which is hinged at 71. The space between baffle plates 64 may, of course, be packed with steel wool or similar material if desired. Funnel member 65 including a drain hole is rigidly attached to chamber 71 as shown. Perforation 69 serves as a slight air leak which will break the vacuum in auxiliary tank 23 and line 30 when three-way valves 17 and 28 are turned to their normal operating position as described above.

The present invention possesses numerous advantages over the known equipment in this field. For example, the large-scale spraying machines in use at present all utilize comparatively high air and oil pressures in their operation, usually from 25 to 130 pounds per square inch and even greater. The above described machine is designed to operate satisfactorily at pressures of the order of 6 to 12 pounds per square inch. As a result the present equipment is both less expensive to manufacture and safer to operate.

The simplicity in operation and control of the described equipment is particularly advantageous. Various types of liquid sprays, whether of the emulsified type, non-emulsified type and whether containing dissolved soluble toxics or insoluble dispersed toxics, may be used with little or no adjustment of the apparatus. The system provided for agitation is efficient, self-operating and requires a minimum of attention, yet is simple and inexpensive.

The quantity of material to be sprayed over a given area of ground may be easily controlled over a wide range. For example, in a field test, quantities of spray ranging from 3 gallons to 10 gallons per acre were distributed by merely changing the air pressure over the liquid in the constant level chamber. During the test the pumping rate, overall air pressure on the system and other variables were held constant. By modifying other operating conditions as desired, an even greater metering range will be obtainable.

We claim as our invention:

1. In agricultural spraying equipment of the class described including an air pump, a liquid pump, a supply tank, a constant level chamber, atomization means, liquid line means for supplying liquid from said supply tank through said liquid pump and said constant level chamber to said atomization means, means for withdrawing liquid from said atomization means to said supply tank comprising an auxiliary tank, a liquid line from said tank to said supply tank, a check valve in said line whereby liquid may flow from said auxiliary tank to said supply tank and whereby reverse flow through said line is prevented, a three-way valve in the liquid line between said constant level chamber and said atomization means, a liquid line between said three-way valve and said auxiliary tank, an air line between said auxiliary tank and the intake side of said air pump, a three-way valve in said last named line, an air line from said last named three-way valve to a source of air intake, said three-way valves being adapted to operate simultaneously whereby in one position liquid will flow from said constant level chamber to said atomization means and air will be drawn from said source of air supply to said air pump and whereby in a second position air will be drawn from said auxiliary tank to said air pump and liquid will be drawn from said atomization means to said auxiliary tank and further flow of liquid from said constant level chamber prevented.

2. Agricultural spraying apparatus comprising a supply tank, a liquid forcing pump, an air pump, a constant level chamber, means for transporting liquid from said supply tank through said liquid pump to said constant level chamber whereby there is sufficient flow to said constant level chamber to maintain the desired liquid level in said chamber and the remainder of said liquid pump discharge is recirculated to said supply tank, a line for transporting liquid from said constant level chamber to atomization means, a three-way valve located in said last named line, an auxiliary tank having a liquid line to said three-way valve and a second liquid line including a check valve and returning to the aforesaid supply tank, an air line between the discharge side of the air pump and said atomization means, means incorporated in said last named line for maintaining an air pressure on the surface of the liquid in the constant level chamber, said last named means comprising an air line communicating between said constant level chamber and said air line between said discharge side of the air pump and said atomization means, means for regulating said air pressure in said constant level chamber and thereby controlling the rate of liquid flow from said constant level chamber to said atomization means, said regulating means comprising an air pressure regulator valve disposed in said air line communicating between said constant level chamber and said air line between the discharge side of said air pump and said atomization means, an air line between the intake side of said air pump and a source of air intake, a second three-way valve incorporated in said last named connection, an air line between said second mentioned three-way valve and said auxiliary tank, both said three-way valves being adapted to operate simultaneously whereby communication through the liquid lines from said constant level chamber to said atomization means may be reversed to permit flow from said atomization means to said auxiliary tank and whereby communication through said air lines between said air lines between said source of air intake and said intake side of said air pump will be reversed simultaneously to cause said air pump to evacuate said auxiliary tank.

ALEXANDER ROBSON BLACK.
EVERETT BURR GLENDENNING.